UNITED STATES PATENT OFFICE.

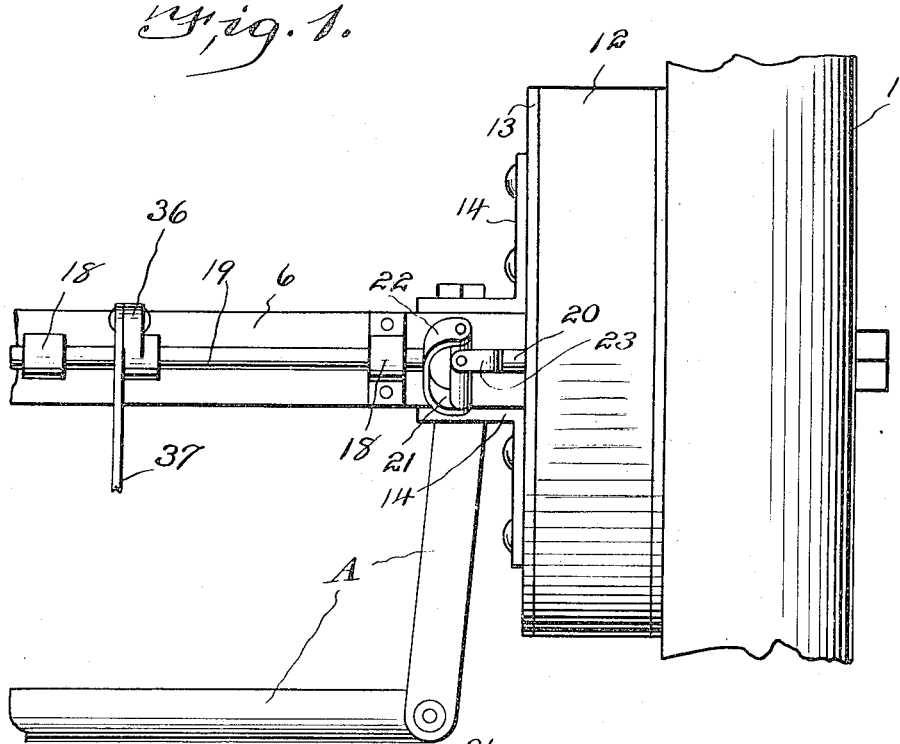
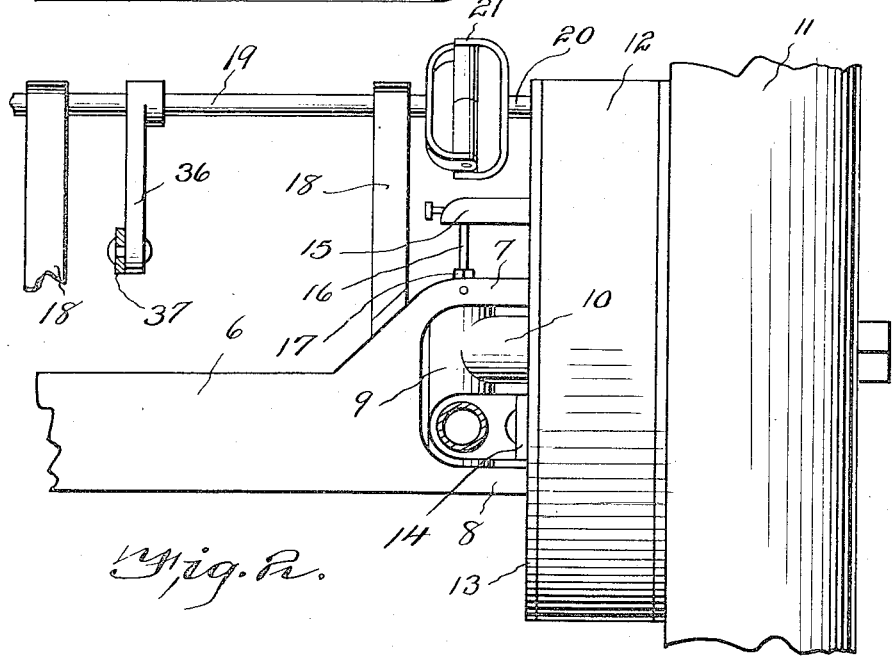

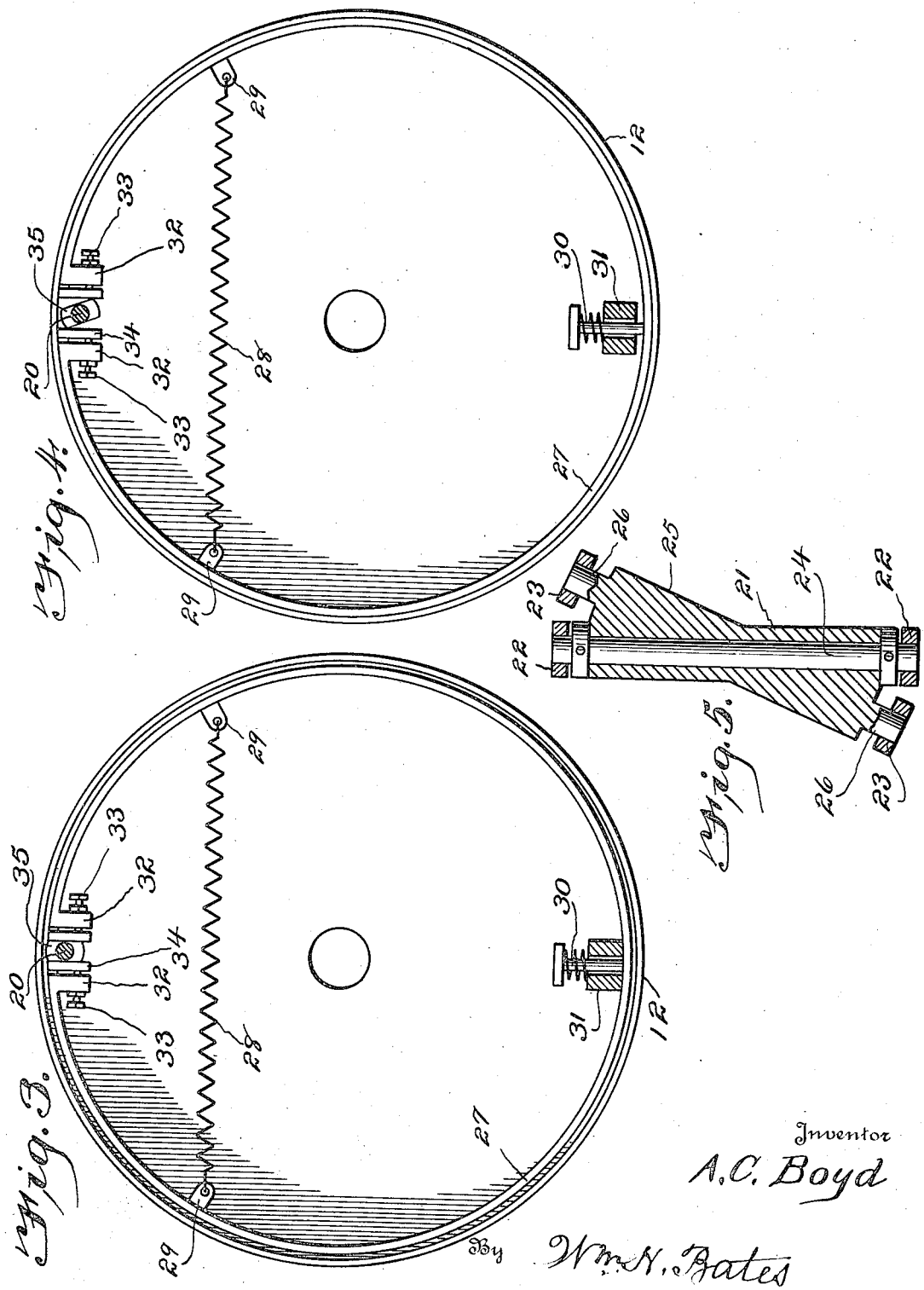

AUSTIN C. BOYD, OF REYNOLDSTOWN, MARYLAND.

BRAKE MECHANISM FOR MOTOR-VEHICLES.

1,243,696.   Specification of Letters Patent.   Patented Oct. 23, 1917.

Application filed May 23, 1917. Serial No. 170,406.

*To all whom it may concern:*

Be it known that I, AUSTIN C. BOYD, citizen of the United States, residing at Reynoldstown, in the county of Baltimore and State of Maryland, have invented certain new and useful Improvements in Brake Mechanism for Motor-Vehicles, of which the following is a specification.

This invention relates to certain new and useful improvements in brake mechanism for motor vehicles.

The primary object of the present invention is to provide a novel form of construction of brake mechanism especially designed for the front wheels of motor vehicles which may be operated in a quick and efficient manner to bring the vehicle to a sudden stop without undue strain on the several parts comprising the device.

Another object of the invention is to specifically improve the form and construction of brake disclosed and claimed in my former patent, Number 1,146,918 granted July 20, 1915, in such manner that the position of the joint between the sectional shaft for operating the brake band will determine the exact position of the brake band relative to the drum, such joint being so located as to permit ready observation when desired.

With the above and other objects in view, and others that will appear as the nature of the invention is better understood the same consists in the novel construction, combination and arrangement of parts to be hereinafter more fully described and then claimed.

In the accompanying drawings, forming a part of this application, which shows the preferred form of the invention, and to which reference is had by like characters designating corresponding parts throughout the several views:—

Figure 1 is a top plan view of a portion of a motor vehicle chassis with the present invention in operative position, Fig. 2 is an elevational view of the same, Fig. 3 is an elevational view of the brake drum and band, with the band in released position, Fig. 4 is a view similar to Fig. 3, with the brake band in operative applied position, and Fig. 5 is a detail sectional view of the improved form of connection between the sectional brake band rods.

Briefly described, the invention aims to improve the form and construction of brake devices specially designed for front wheels of motor vehicles, wherein knuckle-joints having stub-axles are utilized. With the brakes positioned on the wheel hubs, and being bodily movable therewith when the wheel is deviated from its straight course, it is necessary that the brake rod for operating the brake band should also be formed of sections, and the gist of the present invention is in the provision of a peculiar construction of brake rod joint whereby the relative positions of the brake drum and band may be easily and quickly determined so that one may know whether the brake band is properly operating by complete engagement and release relative to the drum.

The general chassis construction disclosed in this application is quite similar to that shown in my prior Patent Number 1,146,918 and includes a front axle 6 having the end thereof forked to provide upper and lower bearings 7 and 8 respectively. A T-shaped knuckle joint of the stub-axle type has the head 9 thereof journaled vertically in the bearings 7 and 8, while the horizontal axle section 10 of the knuckle joint supports the wheel 11.

As shown more clearly in Figs. 1 and 2, a brake drum 12 is secured to the inner side of the wheel 11, in any convenient manner, and a cover plate 13 closes the inner face of the drum, the cover plate being held in position by the angle braces 14 that are supported by the vertical arm 9 of the knuckle joint. The plate 13 is further held in position and against rattling movement by a bracing device including an arm 15 projecting from the inner face of the plate, and adjustably receiving therein, the upper end of the rod 16 which engages at its lower end, the socket 17 upon the upper bearing 7.

A pair of upstanding brackets 18 are carried by the axle 6, and are formed at their upper ends with journal bearings in which is mounted a horizontal brake rod 19 divided to provide a section 20 which is supported by the plate 13, the brake rod sections being connected by the improved form of universal joint 21. The joint 21 is shown more clearly in Figs. 1, 2 and 5 and includes, in part, a pair of U-shaped brackets 22 and 23 carried by the adjacent ends of the brake rod sections. An X-shaped form of casting as shown in Fig. 5 has a pair of crossed axes with the opposed ends coadjacent, while the casting in line with one of the axes is bored to receive a pin 24, the remaining angular portion 25 of the casting being of solid construction. The opposite ends of the pin 25 slightly project from the casting and are adapted to be received in the free ends of the bracket 22. The free ends of the bracket 23 are similarly received on the reduced ends 26 of the casting portion 25 which arrangement connects the axle sections in a universal manner.

As shown in Figs. 3 and 4, the brake band 27 is in the form of a split expansible ring, the same being held normally out of engagement with the drum 12 by the spring 28 connected at its ends to the band lugs 29. The spring 28 is assisted in performing its function by the spring pressed pin 30 carried to the lower end of the brake band, the spring engaging at its opposite ends, a head upon the pin, and the lugs 31. Each split end of the brake band has an angular inwardly directed lug 32 through which project adjusting screws 33 for shifting the plates 34 for varying the distance between the lugs 32. The brake rod section 20 is supported by the drum plate 13 and the inner end thereof carries a cam 35 positioned between the lugs 32, so that when the brake rod 19 is rotated, similar motion is imparted to the cam 35 which will spread the ends of the brake band against the tension of the spring 28 and spring pressed pin 30, moving the band over its entire periphery into engagement with the drum 12.

When the wheel 11 and stub-axle are moved from a straight course by operation of the steering mechanism A, the brake rod section 20 is similarly moved as the universal joint 21 is in vertical alinement with the vertical bearing 9. A crank arm 36 is fixed to the brake rod section 19 and is operated by the connecting rod 37. By the particular construction and arrangement of the rod joint 21, the brake band may be efficiently operated, regardless of the angular position of the wheel 11 and brake rod section 20. It is to be noted that the casting connecting the U-shaped brackets 22 and 23 is designed in operation to have the pin 24 vertically disposed when the brake band 27 is disengaged from the drum 12, and when so positioned, the axis of the solid portion 25 of the casting is inclined to the vertical. When the brake band 27 is expanded into engagement with the brake drum 12 by the cam 35 upon the section 20 of the brake rod, the X-shaped casting will be shifted by the brake rod so that pin 24 extends at an inclination to the vertical, while the axis of the solid portion 25 of the casting extends vertically. With this arrangement, it may be easily determined whether the brake band 27 is engaged or disengaged from the brake drum 12, so that one may readily know whether the brake band is functioning properly.

While I have shown and described the preferred employment of the invention, it is to be understood that various changes may be made in the details of construction without departing from the spirit of the invention as described and claimed.

What I claim is:—

1. A brake mechanism for the front wheels of motor vehicles comprising in combination with a shiftable front wheel of the stub axle type having a brake drum secured thereto, a brake band operating in connection with the drum, a brake rod formed of two sections, an X-shaped casting interposed between the adjacent ends of the brake rod sections, said casting having a pair of crossed axes, a U-shaped bracket carried by the adjacent end of each rod section having the opposite ends thereof axially supporting the X-shaped casting, the said casting adapted to have one axis thereof vertically positioned when the brake band is operating, and the other axis thereof vertically positioned when the brake band is inoperative.

2. A brake mechanism for motor vehicles comprising a two-part brake rod, an X-shaped casting connecting the adjacent end of the brake rod and having a pair of crossed axes, the casting being so positioned that the axes are selectively positioned vertically when the brake mechanism is operative and inoperative.

In testimony whereof I affix my signature in the presence of two witnesses.

AUSTIN C. BOYD.

Witnesses:
 VICTOR S. BLUNDON,
 LOUIS C. DISMER.